(12) United States Patent
Nogueira, Jr.

(10) Patent No.: US 11,935,076 B2
(45) Date of Patent: Mar. 19, 2024

(54) VIDEO SENTIMENT MEASUREMENT

(71) Applicant: Juan Nogueira, Jr., Covington, LA (US)

(72) Inventor: Juan Nogueira, Jr., Covington, LA (US)

( * ) Notice: Subject to any disclaimer, the term of this patent is extended or adjusted under 35 U.S.C. 154(b) by 0 days.

(21) Appl. No.: 18/098,229

(22) Filed: Jan. 18, 2023

(65) Prior Publication Data
US 2023/0245143 A1 Aug. 3, 2023

Related U.S. Application Data

(60) Provisional application No. 63/306,064, filed on Feb. 2, 2022.

(51) Int. Cl.
G06Q 30/0201 (2023.01)
G06Q 30/0217 (2023.01)
G06V 40/16 (2022.01)
G10L 15/26 (2006.01)
H04N 21/442 (2011.01)

(52) U.S. Cl.
CPC ..... *G06Q 30/0201* (2013.01); *G06Q 30/0217* (2013.01); *G06V 40/174* (2022.01); *G10L 15/26* (2013.01); *H04N 21/44218* (2013.01)

(58) Field of Classification Search
None
See application file for complete search history.

(56) References Cited

U.S. PATENT DOCUMENTS

| | | | | |
|---|---|---|---|---|
| 2002/0032906 | A1* | 3/2002 | Grossman | H04N 21/812 348/E7.071 |
| 2009/0083631 | A1* | 3/2009 | Sidi | H04L 67/535 715/721 |
| 2010/0070987 | A1* | 3/2010 | Amento | H04H 60/33 725/18 |
| 2013/0046577 | A1* | 2/2013 | Marci | A61B 5/16 705/7.29 |
| 2013/0247081 | A1* | 9/2013 | Vinson | H04N 21/254 725/14 |
| 2014/0172848 | A1* | 6/2014 | Koukoumidis | G06F 16/78 707/736 |
| 2014/0344842 | A1* | 11/2014 | Yeh | H04N 21/251 725/10 |
| 2015/0020086 | A1* | 1/2015 | Chen | H04H 60/46 725/12 |
| 2016/0275833 | A1* | 9/2016 | Forbes | H04N 21/4668 |
| 2017/0070305 | A1* | 3/2017 | Bowden | H04H 60/33 |
| 2017/0171614 | A1* | 6/2017 | el Kaliouby | G16H 50/70 |
| 2017/0251262 | A1* | 8/2017 | Bist | H04N 21/6582 |
| 2017/0257410 | A1* | 9/2017 | Gattis | H04N 21/2353 |
| 2018/0376209 | A1* | 12/2018 | Ramey | H04L 67/63 |
| 2019/0090020 | A1* | 3/2019 | Srivastava | G11B 27/28 |
| 2023/0156286 | A1* | 5/2023 | Valery | H04N 21/8456 725/37 |
| 2023/0316429 | A1* | 10/2023 | Benfield | G06F 16/783 707/743 |

* cited by examiner

*Primary Examiner* — Alexander Q Huerta
(74) *Attorney, Agent, or Firm* — Cygnet IP Law, P.A.; Stephen W. Aycock, II

(57) ABSTRACT

Computer-implemented user sentiment measurement methods, systems, and computer-readable media are described.

14 Claims, 8 Drawing Sheets

VIDEO SENTIMENT MEASUREMENT

RELATED APPLICATIONS

This application claims the benefit of U.S. Application No. 63/306,064, entitled "Video Sentiment Measurement," and filed on Feb. 2, 2022, which is incorporated herein by reference in its entirety.

FIELD

Some implementations are generally related to sentiment measurement, and, in particular, to systems, methods, and computer readable media for video sentiment measurement.

BACKGROUND

Sentiment test techniques such as dial tests and trace tests are a common method for measuring second by second viewer feedback for the purpose of testing user reaction or sentiment to video content, talent, etc. One method of execution such tests is utilizing a physical testing facility and asking respondents to sit and view one or more videos and turn a physical dial to the left or right to record favorability for each second.

Market researchers have developed digital dials that are usually a horizontal slider user interface element. One issue with these conventional slider user interface elements is that they do not ensure the video is being viewed. Some implementations were conceived in light of one or more of the above-mentioned problems or limitations.

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

SUMMARY

Some implementations can include a computer-implemented method comprising accessing a video, causing the video to be displayed on a device corresponding to a user within a graphical user interface including a first sentiment measurement user interface element, and detecting selection of a play button from the graphical user interface. The method can also include causing the video to be played as long as the play button is selected, and as the video is being played, measuring a first sentiment value corresponding to a position of the first sentiment measurement user interface element and a timestamp of the first sentiment value corresponding to a time in the video. The method can further include, when playing the video is completed, stopping playback of the video and stopping the measuring of the first sentiment value, and storing recorded first sentiment values and corresponding timestamps.

The method can also include as the video is being played, recording a user video of the user via a camera coupled to the device corresponding to the user. The method can further include programmatically analyzing the user video including one or more of detecting facial expressions and converting audio in the user video into text to generate user video data and storing the user video data with recorded sentiment values and corresponding timestamps.

The method can also include, when the play button is deselected during playback of the video: pausing playing of the video; causing a comment box to be displayed; receiving input from the user via the comment box; and storing the input received from the user along with a time stamp corresponding to a time when the play button was deselected. The method can further include, when the play button is selected again, resuming playing the video.

The method can also include when the user completes the playing of a video, generating an electronic reward code and associating the electronic reward code with an account of the user. In some implementations, the first sentiment measurement user interface element is combined with the play button, wherein a first user action is associated with the play button and a second user action is associated with measurement of the first sentiment.

The method can also include causing a second sentiment measurement user interface element to be displayed, and, as the video is being played, measuring a second sentiment value corresponding to a position of the second sentiment measurement user interface element and a timestamp of the second sentiment value corresponding to a time in the video. The method can further include, when the playing video is completed, stopping the playback of the video and stopping the measuring of the second sentiment value, and storing recorded second sentiment values and corresponding timestamps.

In some implementations, the second sentiment measurement user interface element is combined with the first sentiment measurement user interface element and the play button, and a third user action is associated with measurement of the second sentiment.

In some implementations, the first sentiment measurement user interface element includes a sliding interface in a first axis and the second sentiment measurement user interface element includes a sliding interface in a second axis different from the first axis.

Some implementations can include a system comprising one or more processors coupled to a computer-readable medium having stored thereon software instructions that, when executed by the one or more processors, cause the one or more processors to perform operations. The operations can include accessing a video, causing the video to be displayed on a device corresponding to a user within a graphical user interface including a first sentiment measurement user interface element, and detecting selection of a play button from the graphical user interface.

The operations can also include causing the video to be played as long as the play button is selected, and as the video is being played, measuring a first sentiment value corresponding to a position of the first sentiment measurement user interface element and a timestamp of the first sentiment value corresponding to a time in the video. The operations can further include when playing the video is completed, stopping playback of the video and stopping the measuring of the first sentiment value, and storing recorded first sentiment values and corresponding timestamps.

The operations can also include, as the video is being played, recording a user video of the user via a camera coupled to the device corresponding to the user. The operations can further include programmatically analyzing the user video including one or more of detecting facial expressions and converting audio in the user video into text to generate user video data and storing the user video data with recorded sentiment values and corresponding timestamps.

The operations can also include, when the play button is deselected during playback of the video: pausing playing of the video; causing a comment box to be displayed; receiving input from the user via the comment box; storing the input received from the user along with a time stamp corresponding to a time when the play button was deselected; and, when the play button is selected again, resuming playing the video.

The operations can further include, when the user completes the playing of a video, generating an electronic reward code and associating the electronic reward code with an account of the user. In some implementations, the first sentiment measurement user interface element is combined with the play button, where a first user action is associated with the play button and a second user action is associated with measurement of the first sentiment.

The operations can also include causing a second sentiment measurement user interface element to be displayed, and as the video is being played, measuring a second sentiment value corresponding to a position of the second sentiment measurement user interface element and a timestamp of the second sentiment value corresponding to a time in the video. The operations can further include when playing the video is completed, stopping playback of the video and stopping the measuring of the second sentiment value, and storing recorded second sentiment values and corresponding timestamps.

In some implementations, the second sentiment measurement user interface element is combined with the first sentiment measurement user interface element and the play button, and a third user action is associated with measurement of the second sentiment. In some implementations, the first sentiment measurement user interface element includes a sliding interface in a first axis and the second sentiment measurement user interface element includes a sliding interface in a second axis different from the first axis.

Some implementations can include a computer-readable medium having stored thereon software instructions that, when executed by one or more processors, cause the one or more processors to perform operations. The operations can include accessing a video, causing the video to be displayed on a device corresponding to a user within a graphical user interface including a first sentiment measurement user interface element, and detecting selection of a play button from the graphical user interface.

The operations can also include causing the video to be played as long as the play button is selected, and as the video is being played, measuring a first sentiment value corresponding to a position of the first sentiment measurement user interface element and a timestamp of the first sentiment value corresponding to a time in the video. The operations can further include when playing the video is completed, stopping playback of the video and stopping the measuring of the first sentiment value, and storing recorded first sentiment values and corresponding timestamps.

The operations can also include, as the video is being played, recording a user video of the user via a camera coupled to the device corresponding to the user. The operations can further include programmatically analyzing the user video including one or more of detecting facial expressions and converting audio in the user video into text to generate user video data and storing the user video data with recorded sentiment values and corresponding timestamps.

The operations can also include, when the play button is deselected during playback of the video: pausing playing of the video; causing a comment box to be displayed; receiving input from the user via the comment box; storing the input received from the user along with a time stamp corresponding to a time when the play button was deselected; and, when the play button is selected again, resuming playing the video.

The operations can further include, when the user completes the playing of a video, generating an electronic reward code and associating the electronic reward code with an account of the user. In some implementations, the first sentiment measurement user interface element is combined with the play button, where a first user action is associated with the play button and a second user action is associated with measurement of the first sentiment.

The operations can also include causing a second sentiment measurement user interface element to be displayed, and as the video is being played, measuring a second sentiment value corresponding to a position of the second sentiment measurement user interface element and a timestamp of the second sentiment value corresponding to a time in the video. The operations can further include when playing the video is completed, stopping playback of the video and stopping the measuring of the second sentiment value, and storing recorded second sentiment values and corresponding timestamps.

In some implementations, the second sentiment measurement user interface element is combined with the first sentiment measurement user interface element and the play button, and a third user action is associated with measurement of the second sentiment. In some implementations, the first sentiment measurement user interface element includes a sliding interface in a first axis and the second sentiment measurement user interface element includes a sliding interface in a second axis different from the first axis.

DETAILED DESCRIPTION

Some implementations include methods and systems for measuring and visualizing user sentiment toward media (e.g., a video). The systems and methods provided herein may overcome one or more deficiencies of some conventional sentiment measurement systems and methods. For example, some implementations can help ensure the video is being viewed because the user has to hold the play button in order for the video to play. While holding the play button, the user can move the play button up or down within a range to provide an indication of sentiment or favorability (e.g., on a scale of 0 to 100) that is recorded along with a reference to the time in the video where the sentiment was recorded. When the user removes their thumb (or finger) from the player the video stops playing, and it allows an option for the user to input a comment for that moment in the video. The vertical gesture mimics the motion of a "thumbs up/down," that provides a well-understood metaphor for users. The thumb logo illustrates a "thumbs up" for 100 favorability (e.g., most favorable sentiment or response) and "thumbs down" for 0 favorability or least favorable sentiment or response (and increments in between).

Some implementations can be integrated within or as an additional service to a broadcast television (TV) system. For example, an emerging standard in broadcast TV is known as ATSC 3.0, which permits broadcast TV signals to include layers of custom-tailored Internet content and interactivity on broadcast TV. An implementation of the video sentiment measurement method or system can be useful in the ATSC 3.0 ecosystem with versions that function in a similar fashion as described herein (e.g., a user is watching TV, engages their sentiment measurement application on their phone, the application is configured to play, pause, and record viewer sentiment of content on ATSC 3.0+ broadcast TV.

Some implementations can include a physical version of the sentiment measurement system or method, such as a "physical arcade version" that has a physical leaver with a play button that operates in a similar fashion as the graphical user interface elements described herein. In another example, an implementation of the sentiment measurement method or system can be configured for an extended reality, virtual reality, augment reality, or metaverse system and can include user interface elements of the play/slider tool or thumb up/down hand gesture adapted for the virtual environment.

Figure 1:
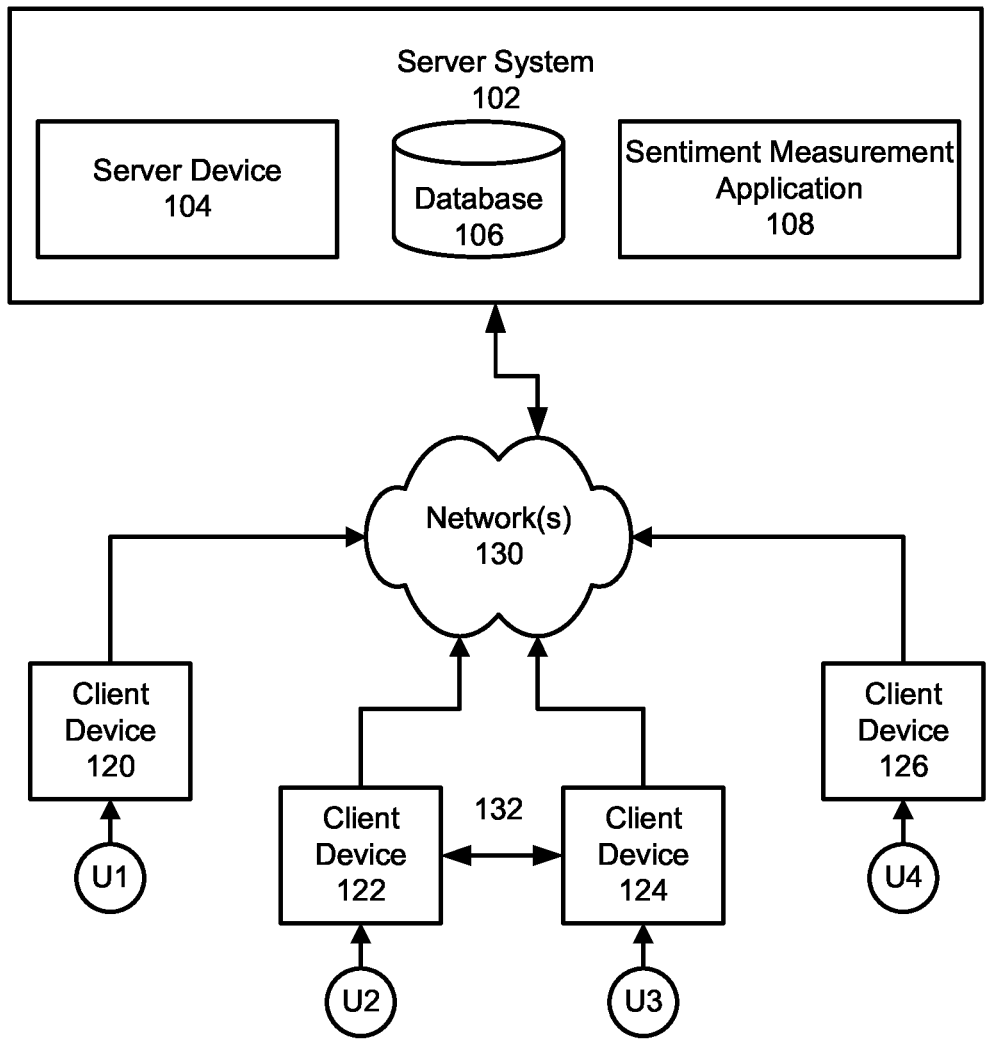
FIG. 1 is a block diagram of an example system and a network environment which may be used for one or more implementations described herein.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other data store or data storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and sentiment measurement application 108. FIG. 1 also shows four blocks for client devices 120, 122, 124, and 126. Some blocks (e.g., 102, 104, and 106) may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, camera, cell phone, smart phone, tablet computer, television, TV set top box or entertainment device, wearable devices (e.g., display glasses or goggles, head-mounted display (HMD), wristwatch, headset, armband, jewelry, etc.), virtual reality (VR) and/or augmented reality (AR) enabled devices, personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., an image sharing service, a messaging service, a social network service or other type of network service, implemented on server system 102. For example, respective client devices 120, 122, 124, and 126 may communicate data to and from one or more server systems (e.g., server system 102). In some implementations, the server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications. In some examples, the network service can include any system allowing users to perform a variety of communications, form links and associations, upload and post shared content such as images, image compositions (e.g., albums that include one or more images, image collages, videos, etc.), audio data, and other types of content, receive various forms of data, and/or perform socially related functions. For example, the network service can allow a user to send messages to particular or multiple other users, form social links in the form of associations to other users within the network service, group other users in user lists, friends lists, or other user groups, post or send content including text, images, image compositions, audio sequences or recordings, or other types of content for access by designated sets of users of the network service, participate in live video, audio, and/or text videoconferences or chat with other users of the service, etc. In some implementations, a "user" can include one or more programs or virtual entities, as well as persons that interface with the system or network.

A user interface can enable display of videos, images, image compositions, data, and other content as well as communications, privacy settings, notifications, and other data on client devices 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, e.g., a display screen, projector, etc. In some implementations, application programs running on a server system can communicate with a client device to receive user input at the client device and to output data such as visual data, audio data, etc. at the client device.

In some implementations, server system 102 and/or one or more client devices 120-126 can provide a sentiment measurement, recording, and reporting system.

Various implementations of features described herein can use any type of system and/or service. Any type of electronic device can make use of features described herein. Some implementations can provide one or more features described herein on client or server devices disconnected from or intermittently connected to computer networks.

Figure 2:
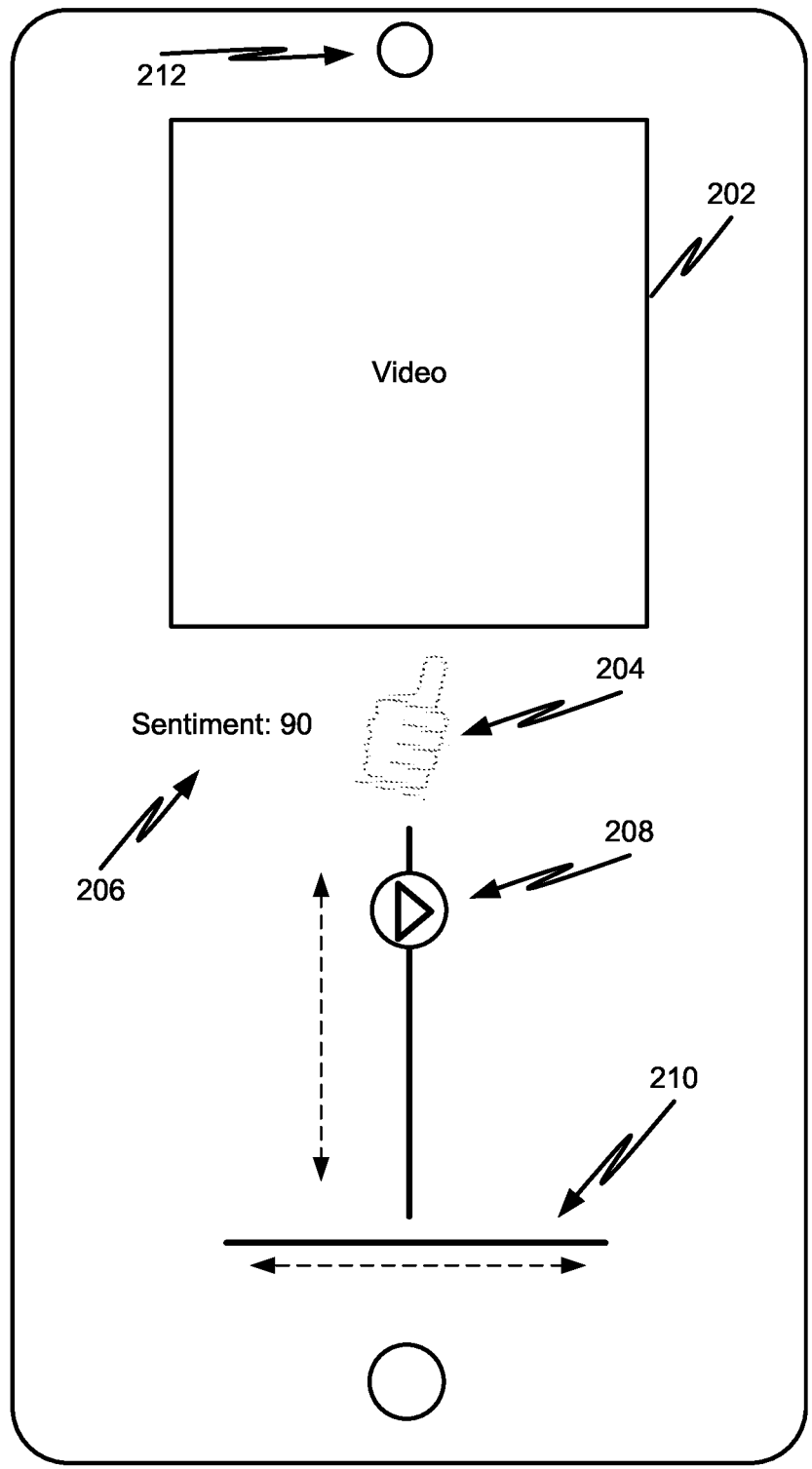
FIG. 2 is a diagram of an example user sentiment measurement graphical user interface in accordance with some implementations.

FIG. 2 is a diagram of an example user sentiment measurement graphical user interface (GUI) 200 in accordance with some implementations. The GUI 200 includes a video display element 202, a visual sentiment indicator 204, a sentiment value indicator 206, and a video play button/sentiment slide 208 (e.g., a combination of a video play button and a sentiment value user interface element such as a sliding element), and a second sentiment value indicator 210 (optional). Where the video play button/sentiment slide 208 combination includes a vertical sliding element and the second sentiment value indicator 210 is a horizontal sliding element. In some implementations, the video play button, the first sentiment value user interface element and the second sentiment value user interface element can be combined into one multifunctional user interface element such that with one finger a user can play a video by pressing and holding the play button and input a first sentiment by sliding along a vertical axis and second sentiment by sliding along a horizontal axis or other axis. It will be appreciated that the sliders are examples and other sentiment indicating elements can be used. Also, an implementation may measure one or more sentiments.

Figure 8:
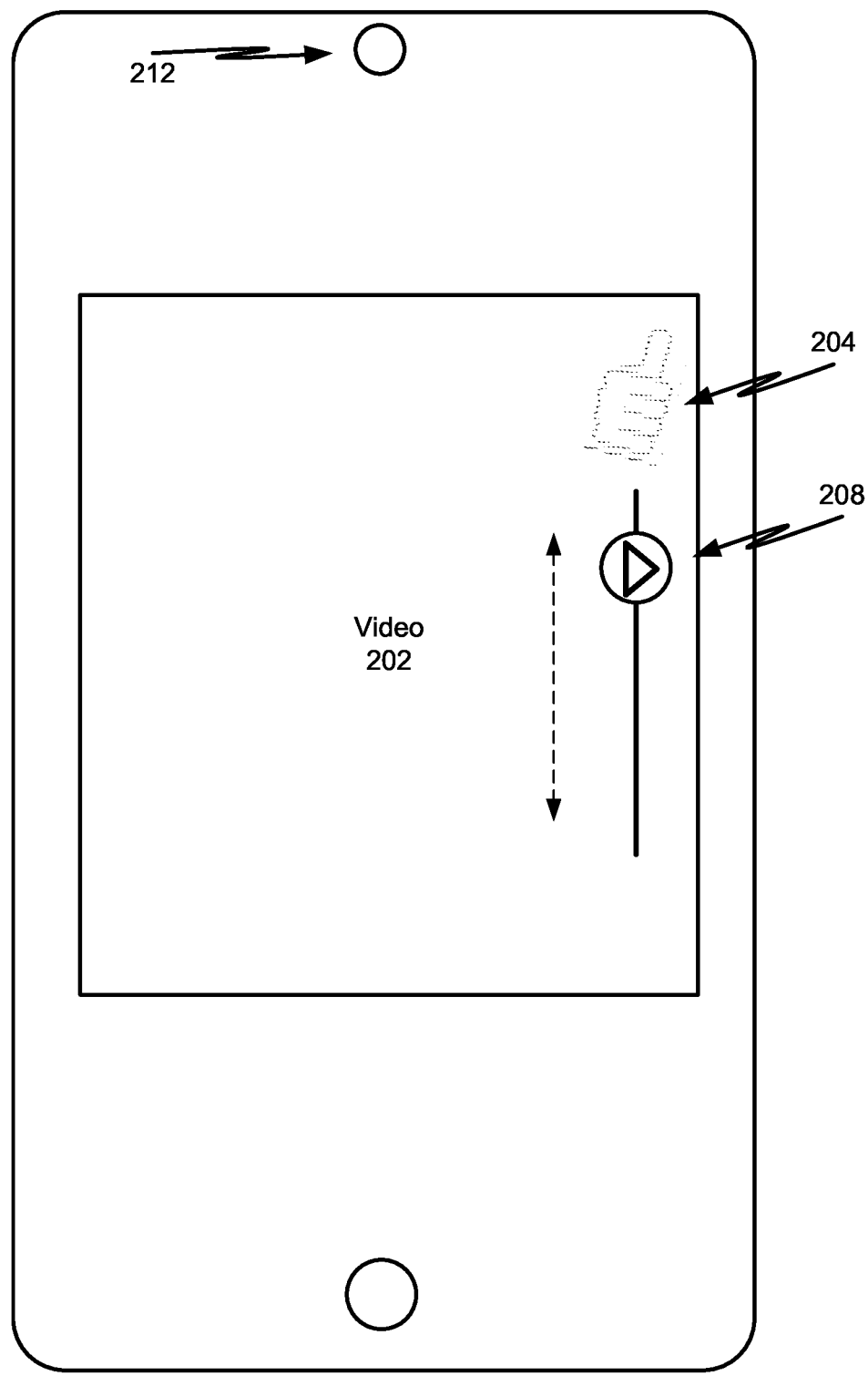
FIG. 8 is a diagram of an example user sentiment measurement graphical user interface in accordance with some implementations.

FIG. 8 is a diagram of another example user sentiment measurement GUI 800 in accordance with some implementations. In GUI 800, the visual sentiment indicator 204 and the video play button/sentiment slide 208 (e.g., a combination of a video play button and a sentiment value user interface element such as a sliding element) are displayed within the video display element 202.

Figure 3:
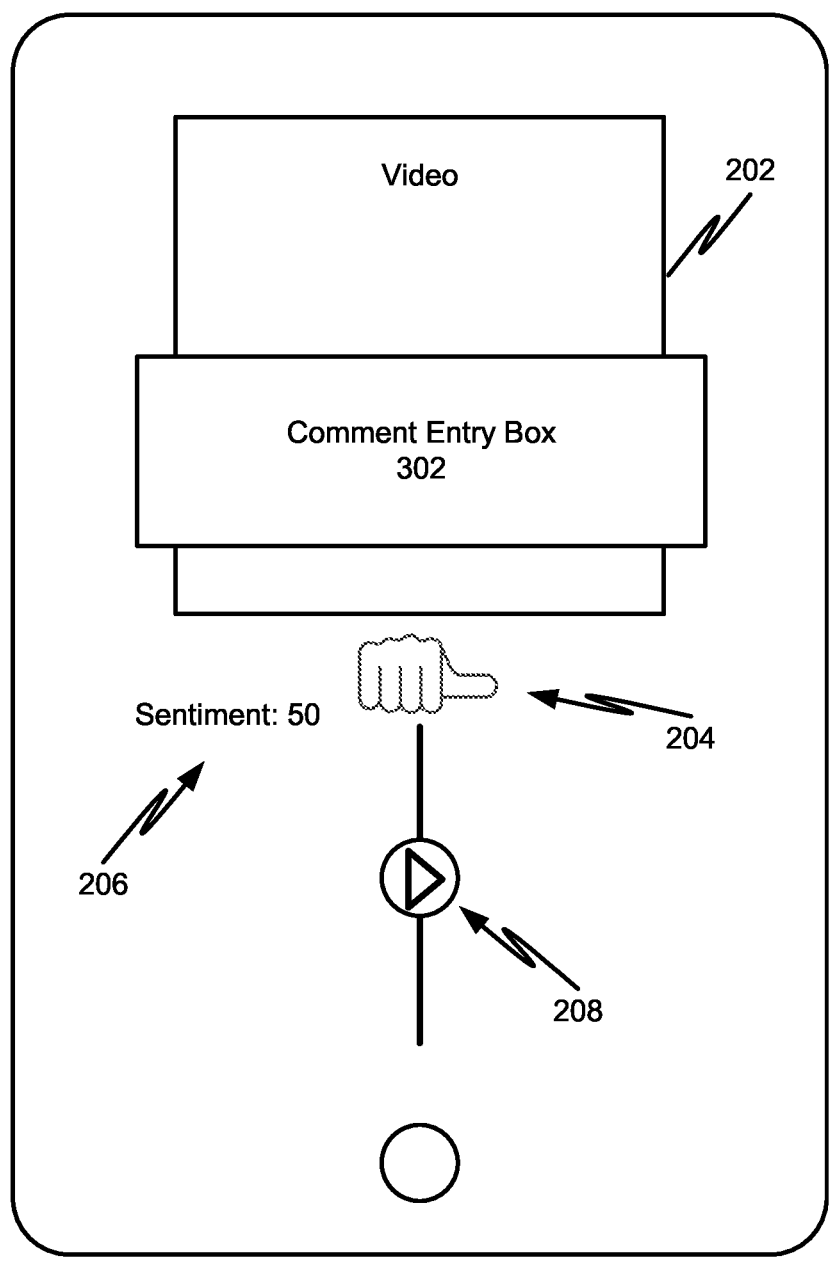
FIG. 3 is a diagram of an example user sentiment measurement graphical user interface in accordance with some implementations.

FIG. 3 is a diagram of an example user sentiment measurement graphical user interface 300 in accordance with some implementations. GUI 300 includes the elements shown in FIG. 2 and described above plus an optional comment entry box 302.

Figure 4:
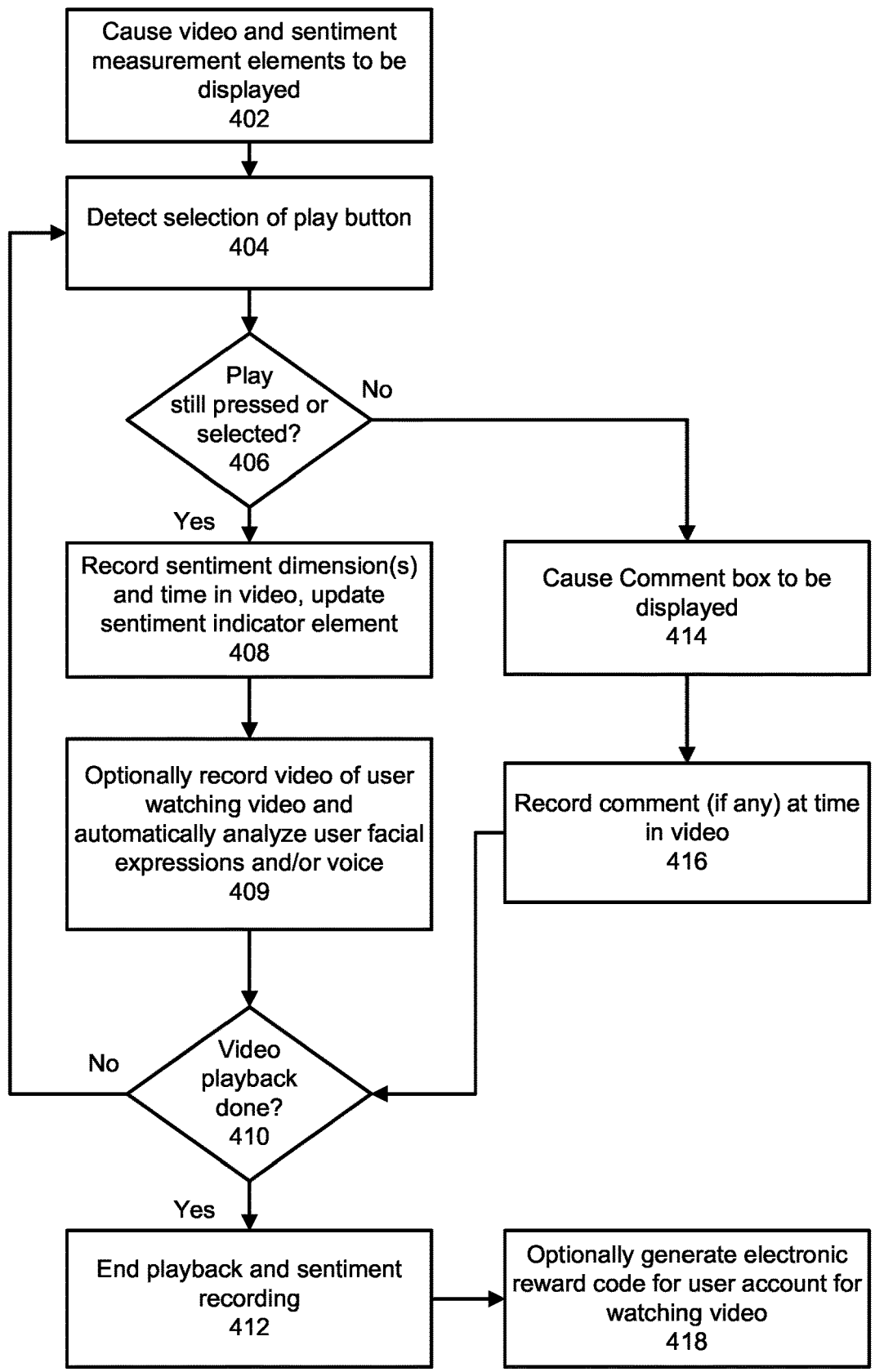
FIG. 4 is a flowchart of an example method of measuring user sentiment toward a video in accordance with some implementations.

FIG. 4 is a flowchart of an example method 400 of measuring user sentiment toward a video in accordance with some implementations. Processing begins at 402, where a video and sentiment measurement controls are caused to be displayed. For example, a graphical user interface such as 200 could be caused to be displayed and a video accessed for playing in the video display element 202. Processing continues to 404.

At 404, selection or pressing of the video play button/sentiment slider button (e.g., 208) is detected. When pressing or selection of the video play button/sentiment slider is detected, the video is played, and the user sentiment is measured (based on the position of the button on the slider) and stored. In some implementations, as mentioned above, a second or more user sentiment dimension can be measured using an optional additional user sentiment user interface element. For example, the first user sentiment user interface control can measure a like/dislike sentiment, and a second user sentiment user interface element can measure a sentiment such as trust, attractiveness, appropriateness, sensitivity to diverse audiences, clarity, value, etc. Processing continues to 406.

At 406, it is determined whether the video play button is pressed or selected. If the button is pressed, processing continues to 408. Otherwise, processing continues to 414.

At 414, a comment box is caused to be displayed. The comment box can receive comments from the user, where. Processing continues to 416.

At 416, the comments received in 414 can be stored and associated with a time in the video where the playback button was released. Processing continues to 410.

At 408, the user sentiment indication (e.g., value corresponding to the position of play button 208 on slider) is recorded and the visual sentiment indicator (e.g., 204) is updated. Processing continues to 409.

At 409, the system can optionally record a video of the user with or without audio. The video can be recorded via a camera on the user's device (e.g., 212) to obtain a "selfie" video recording of the user. A major advantage of the disclosed method and system is that video creators and publishers are able to ensure their video is being viewed as sentiment information is being collected. An additional feature to ensure every video is being viewed by a human is to enable the user to opt in to allow the "selfie video camera" on a phone to actually record their face while watching video content. Recording the viewer watching the video content will work in conjunction with the play/slider by adding the function of "recording selfie video" while the user is holding the play button (and sliding up and down). This can be referred to as a play/record/slider.

This selfie video recording will permit second-by-second video comments from each user. The video sentiment system or platform can aggregate similar selfie video comments using speech to text recognition. In some implementations, facial recognition software can be used to measure viewer sentiment from the selfie video. Processing continues to 410.

At 410 it is determined whether the video playback has finished. If so, processing continues to 412. If video playback has not ended, then processing returns to 404.

At 412, video playback ends and the sentiment recording ends.

At 418, the system optionally generates an electronic reward code (or token) that is associated with the user's account and can be used to redeem prizes. The electronic reward code or token can provide an incentive for a user to watch and provide sentiment feedback on videos.

The steps in FIG. 4 can be repeated in whole or in part for further video sentiment measurement.

Figure 5:
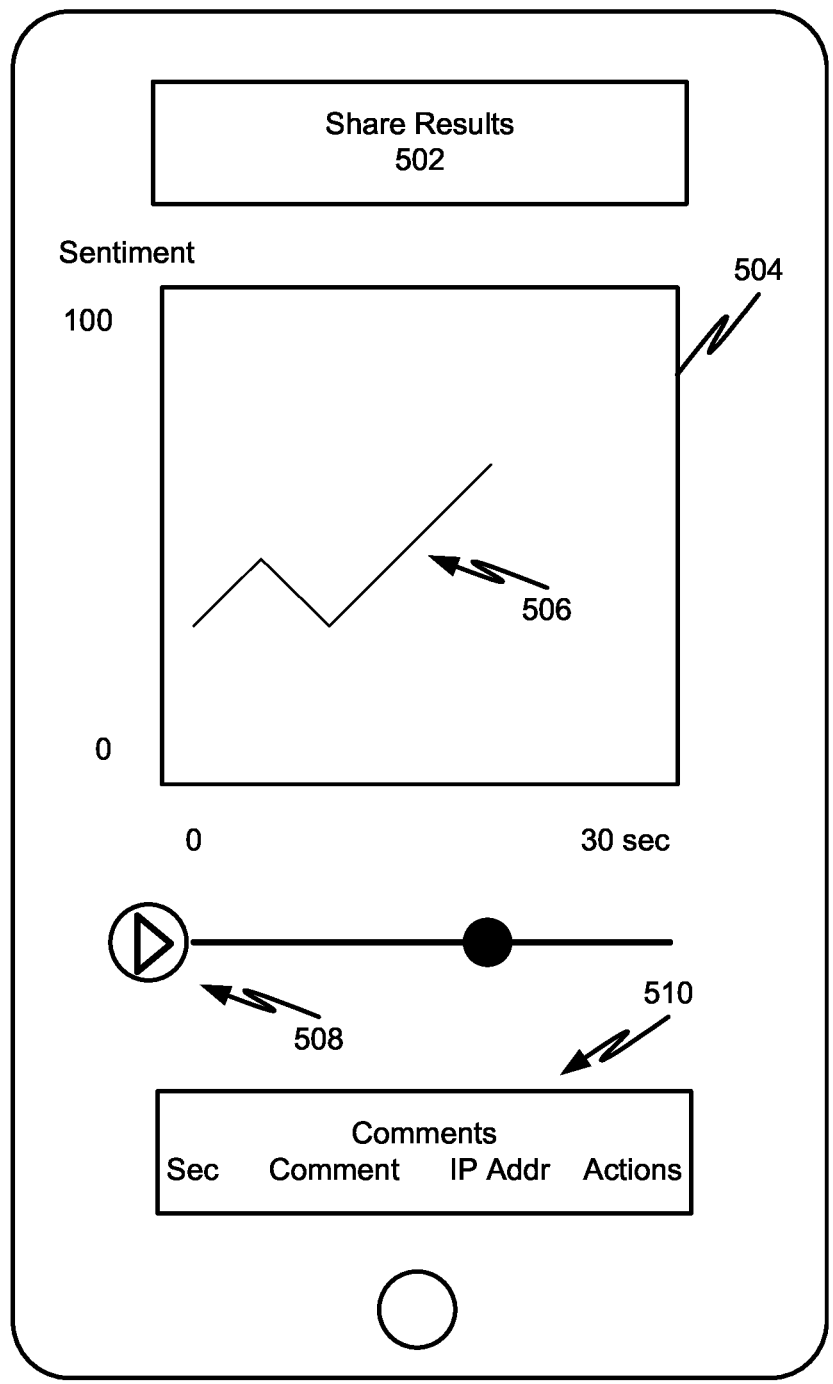
FIG. 5 is a diagram of an example display of a measured video sentiment graphical user interface in accordance with some implementations.

FIG. 5 is a diagram of an example display of a measured video sentiment graphical user interface 500 in accordance with some implementations. The GUI 500 includes an element to share results 502 (e.g., via email, text, or other electronic communication technique), a video play back element 504, a graphical indication of sentiment 506 (e.g., optionally overlaid on the video), play button and video position indicator 508, comments display element 510 (e.g., showing one or more of time in video, comment, IP address comment was received from, and actions, or other suitable data).

Figure 6:
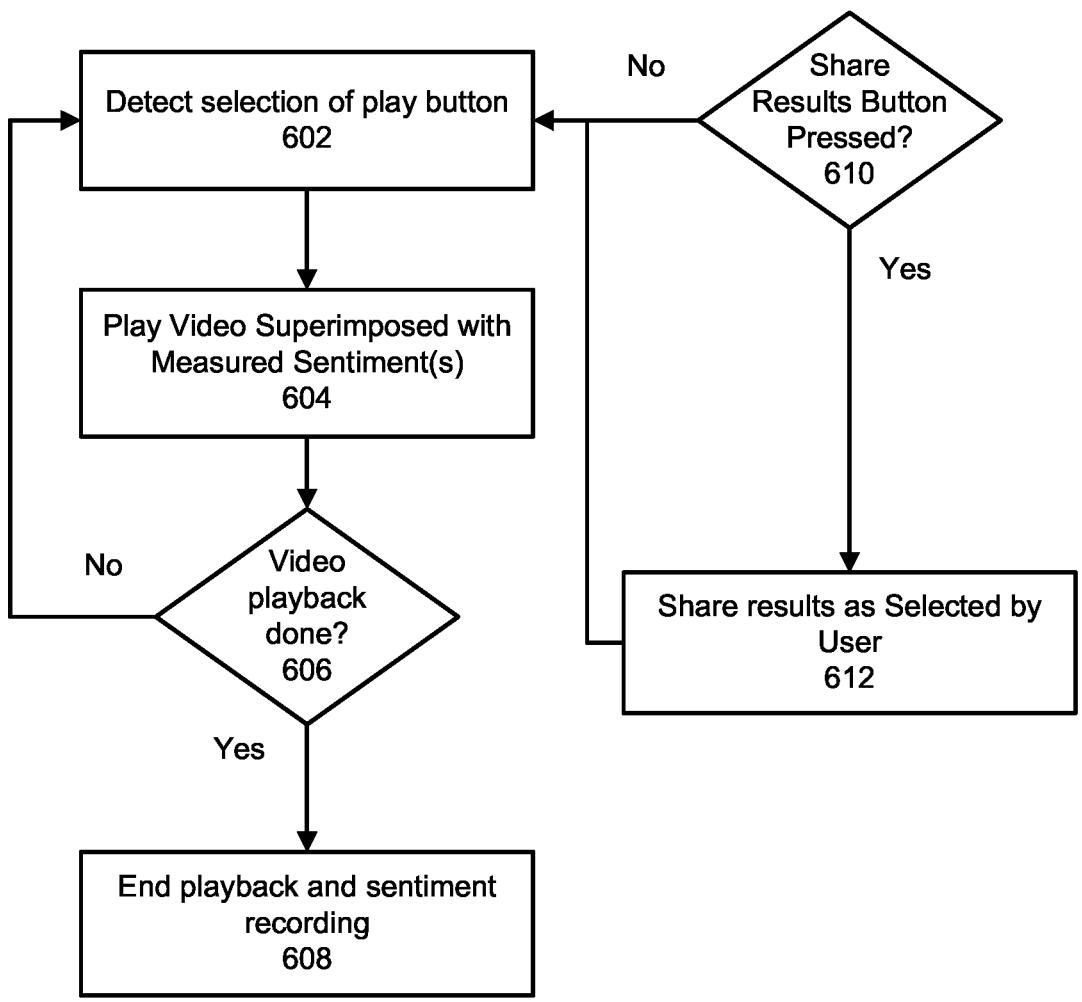
FIG. 6 is a flowchart of an example method of displaying and sharing measured user sentiment toward a video in accordance with some implementations.

FIG. 6 is a flowchart of an example method 600 of displaying and sharing measured user sentiment toward a video in accordance with some implementations. Processing begins at 602, where pressing or selection of the play button (e.g., 508) is detected. Processing continues to 604.

At 604, video playback is started, and sentiment data is displayed (e.g., video in 504 and sentiment data 506 optionally superimposed on video). Also, the position indicator 508 is updated as the video plays. Processing continues to 606.

At 606, it is determined if video playback has ended. If the video playback has ended processing continues to 608. Otherwise, processing continues to 602.

Also, the user may press a pause button (e.g., 508) and the video playback will pause until the user presses the button again to resume play.

At 610, it is determined if the share button is pressed. If so, processing continues to 612.

At 612, results are shared according to a method selected by the user (e.g., email, text, or other electronic communications method). Processing returns to 602.

Figure 7:
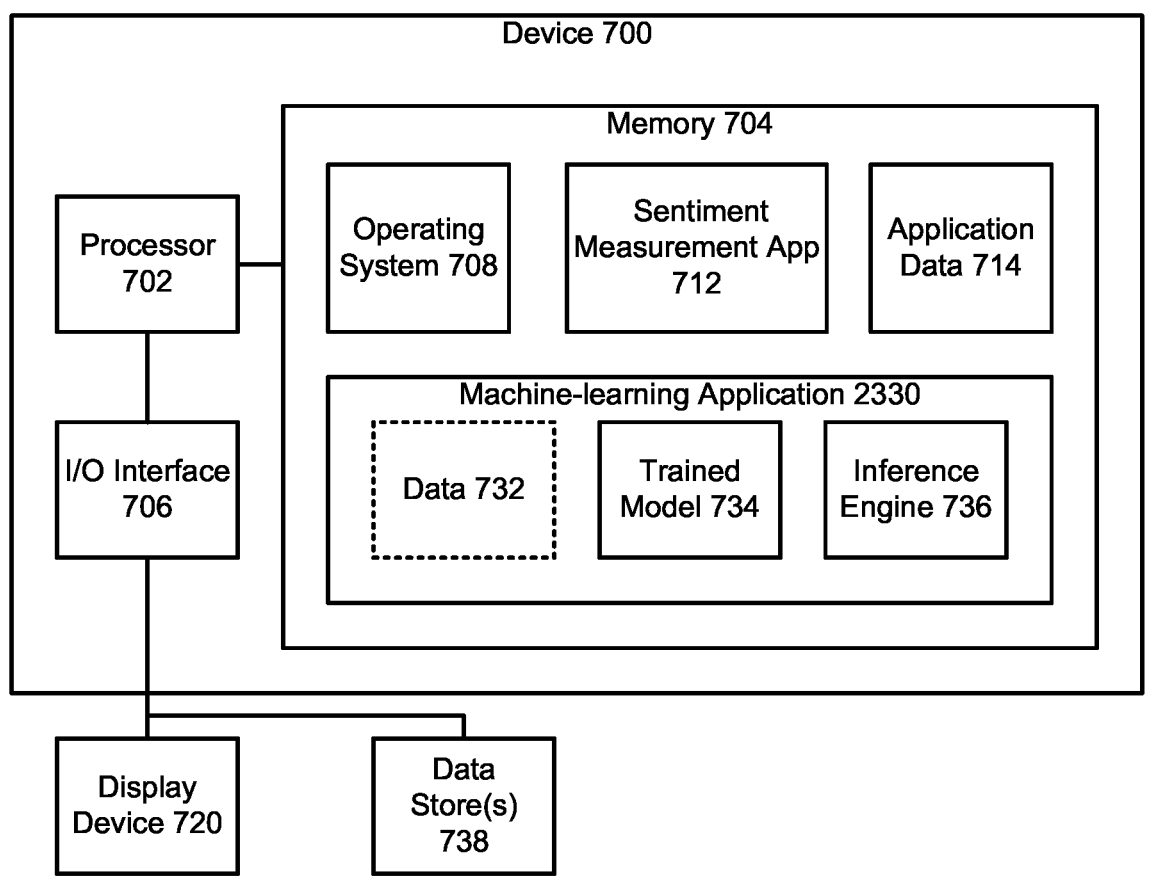
FIG. 7 is a block diagram of an example computing device which may be used for one or more implementations described herein.

FIG. 7 is a block diagram of an example device 700 which may be used to implement one or more features described herein. In one example, device 700 may be used to implement a client device, e.g., any of client devices 120-126 shown in FIG. 1. Alternatively, device 700 can implement a server device, e.g., server device 104, etc. In some implementations, device 700 may be used to implement a client device, a server device, or a combination of the above. Device 700 can be any suitable computer system, server, or other electronic or hardware device as described above.

One or more methods described herein (e.g., as shown in FIGS. 4 and 6) can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.).

In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 700 includes a processor 702, a memory 704, and I/O interface 706. Processor 702 can be one or more processors and/or processing circuits to execute program code and control basic operations of the device 700. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems.

In some implementations, processor 702 may include one or more co-processors that implement neural-network processing. In some implementations, processor 702 may be a processor that processes data to produce probabilistic output, e.g., the output produced by processor 702 may be imprecise or may be accurate within a range from an expected output. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702 and may be any suitable processor-readable storage medium, such as random-access memory (RAM), read-only memory (ROM), Electrically Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708, machine-learning application 730, user sentiment application 712, and application data 714. Other applications may include applications such as a data display engine, web hosting engine, image display engine, notification engine, social networking engine, etc. In some implementations, the machine-learning application 730 and user sentiment application 712 can each include instructions that enable processor 702 to perform functions described herein, e.g., some or all of the methods of FIGS. 4 and 6.

The machine-learning application 730 can include one or more NER implementations for which supervised and/or unsupervised learning can be used. The machine learning models can include multi-task learning based models, residual task bidirectional LSTM (long short-term memory) with conditional random fields, statistical NER, etc. The Device can also include a user sentiment application 712 as described herein and other applications. One or more methods disclosed herein can operate in several environments and platforms, e.g., as a stand-alone computer program that can run on any type of computing device, as a web application having web pages, as a mobile application ("app") run on a mobile computing device, etc.

In various implementations, machine-learning application 730 may utilize Bayesian classifiers, support vector machines, neural networks, or other learning techniques. In some implementations, machine-learning application 730 may include a trained model 734, an inference engine 736, and data 732. In some implementations, data 732 may include training data, e.g., data used to generate trained model 734. For example, training data may include any type of data suitable for training a model for user sentiment tasks, such as images, labels, thresholds, etc. associated with user sentiment prediction described herein. Training data may be obtained from any source, e.g., a data repository specifically marked for training, data for which permission is provided for use as training data for machine-learning, etc. In implementations where one or more users permit use of their respective user data to train a machine-learning model, e.g., trained model 734, training data may include such user data. In implementations where users permit use of their respective user data, data 732 may include permitted data.

In some implementations, data 732 may include collected data such as user sentiment and corresponding videos. In some implementations, training data may include synthetic data generated for the purpose of training, such as data that is not based on user input or activity in the context that is being trained, e.g., data generated from simulated conversations, computer-generated images, etc. In some implementations, machine-learning application 730 excludes data 732. For example, in these implementations, the trained model 734 may be generated, e.g., on a different device, and be provided as part of machine-learning application 2330. In various implementations, the trained model 734 may be provided as a data file that includes a model structure or form, and associated weights. Inference engine 736 may read the data file for trained model 734 and implement a neural network with node connectivity, layers, and weights based on the model structure or form specified in trained model 734.

Machine-learning application 730 also includes a trained model 734. In some implementations, the trained model 734 may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data 732 or application data 714. Such data can include, for example, images, e.g., when the trained model is used for user sentiment prediction functions. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be a prediction of user sentiment for a video, etc. depending on the specific trained model. In some implementations, model form or structure also specifies a number and/or type of nodes in each layer.

In different implementations, the trained model 734 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output.

In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, trained model 734 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 732, to produce a result.

For example, training may include applying supervised learning techniques. In supervised learning, the training data can include a plurality of inputs (e.g., a video) and a corresponding expected output for each input (e.g., a prediction of user sentiment). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided, and the model may be trained to differentiate data, e.g., to cluster input data into a plurality of groups, where each group includes input data that are similar in some manner. For example, the model may be trained to predict user sentiment of a video.

In another example, a model trained using unsupervised learning may cluster words based on the use of the words in data sources. In some implementations, unsupervised learning may be used to produce knowledge representations, e.g., that may be used by machine-learning application 730. In various implementations, a trained model includes a set of weights, or embeddings, corresponding to the model structure. In implementations where data 732 is omitted, machine-learning application 730 may include trained model 734 that is based on prior training, e.g., by a developer of the machine-learning application 730, by a third-party, etc. In some implementations, trained model 734 may include a set of weights that are fixed, e.g., downloaded from a server that provides the weights.

Machine-learning application 730 also includes an inference engine 736. Inference engine 736 is configured to apply the trained model 734 to data, such as application data 714, to provide an inference. In some implementations, inference engine 736 may include software code to be executed by processor 702. In some implementations, inference engine 736 may specify circuit configuration (e.g., for a programmable processor, for a field programmable gate array (FPGA), etc.) enabling processor 702 to apply the trained model. In some implementations, inference engine 736 may include software instructions, hardware instructions, or a combination. In some implementations, inference engine 736 may offer an application programming interface (API) that can be used by operating system 708 and/or user sentiment application 712 to invoke inference engine 736, e.g., to apply trained model 734 to application data 714 to generate an inference.

Machine-learning application 730 may provide several technical advantages. For example, when trained model 734 is generated based on unsupervised learning, trained model 734 can be applied by inference engine 736 to produce knowledge representations (e.g., numeric representations) from input data, e.g., application data 714. For example, a model trained for user sentiment measurement tasks may produce predictions and confidences for given input information about a video. In some implementations, such representations may be helpful to reduce processing cost (e.g., computational cost, memory usage, etc.) to generate an output (e.g., a suggestion, a prediction, a classification, etc.). In some implementations, such representations may be provided as input to a different machine-learning application that produces output from the output of inference engine 736.

In some implementations, knowledge representations generated by machine-learning application 730 may be provided to a different device that conducts further processing, e.g., over a network. In such implementations, providing the knowledge representations rather than the images may provide a technical benefit, e.g., enable faster data transmission with reduced cost. In another example, a model trained for user sentiment prediction may produce a user sentiment signal for one or more videos being processed by the model.

In some implementations, machine-learning application 730 may be implemented in an offline manner. In these implementations, trained model 734 may be generated in a first stage and provided as part of machine-learning application 730. In some implementations, machine-learning application 730 may be implemented in an online manner. For example, in such implementations, an application that invokes machine-learning application 730 (e.g., operating system 708, one or more of user sentiment application 712 or other applications) may utilize an inference produced by machine-learning application 730, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 734, e.g., to update embeddings for trained model 734.

In some implementations, machine-learning application 730 may be implemented in a manner that can adapt to particular configuration of device 700 on which the machine-learning application 730 is executed. For example, machine-learning application 730 may determine a computational graph that utilizes available computational resources, e.g., processor 702. For example, if machine-learning application 730 is implemented as a distributed application on multiple devices, machine-learning application 730 may determine computations to be carried out on individual devices in a manner that optimizes computation. In another example, machine-learning application 730 may determine that processor 702 includes a GPU with a particular number of GPU cores (e.g., 1000) and implement the inference engine accordingly (e.g., as 1000 individual processes or threads).

In some implementations, machine-learning application 730 may implement an ensemble of trained models. For example, trained model 734 may include a plurality of trained models that are each applicable to same input data. In these implementations, machine-learning application 730 may choose a particular trained model, e.g., based on available computational resources, success rate with prior inferences, etc. In some implementations, machine-learning application 730 may execute inference engine 736 such that a plurality of trained models is applied. In these implementations, machine-learning application 730 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 708 or one or more other applications, e.g., user sentiment application 712.

In different implementations, machine-learning application 730 can produce different types of outputs. For example, machine-learning application 730 can provide representations or clusters (e.g., numeric representations of input data), labels (e.g., for input data that includes images, documents, etc.), phrases or sentences (e.g., descriptive of an image or video, suitable for use as a response to an input sentence, suitable for use to determine context during a conversation, etc.), images (e.g., generated by the machine-learning application in response to input), audio or video (e.g., in response an input video, machine-learning application 730 may produce an output video with a particular effect applied, e.g., rendered in a comic-book or particular artist's style, when trained model 734 is trained using training data from the comic book or particular artist, etc. In some implementations, machine-learning application 730 may produce an output based on a format specified by an invoking application, e.g., operating system 708 or one or more applications, e.g., user sentiment measurement application 712. In some implementations, an invoking application may be another machine-learning application. For example, such configurations may be used in generative adversarial networks, where an invoking machine-learning application is trained using output from machine-learning application 730 and vice-versa.

Any of software in memory 704 can alternatively be stored on any other suitable storage location or computer-readable medium. In addition, memory 704 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 704 and any other type of storage (magnetic disk, optical disk, magnetic tape, or other tangible media) can be considered "storage" or "storage devices."

I/O interface 706 can provide functions to enable interfacing the server device 700 with other systems and devices. Interfaced devices can be included as part of the device 700 or can be separate and communicate with the device 700. For example, network communication devices, storage devices (e.g., memory and/or database 106), and input/output devices can communicate via I/O interface 706. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 706 can include one or more display devices 720 and one or more data stores 738 (as discussed above). The display devices 720 that can be used to display content, e.g., a user interface of an output application as described herein. Display device 720 can be connected to device 700 via local connections (e.g., display bus) and/or via networked connections and can be any suitable display device. Display device 720 can include any suitable display device such as an LCD, LED, or plasma display screen, CRT, television, monitor, touchscreen, 3-D display screen, or other visual display device. For example, display device 720 can be a flat display screen provided on a mobile device, multiple display screens provided in a goggles or headset device, or a monitor screen for a computer device.

The I/O interface 706 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 7 shows one block for each of processor 702, memory 704, I/O interface 706, and software blocks 708, 712, and 730. These blocks may represent one or more processors or processing circuitries, operating systems, memories, I/O interfaces, applications, and/or software modules. In other implementations, device 700 may not have all of the components shown and/or may have other elements including other types of elements instead of, or in addition to, those shown herein. While some components are described as performing blocks and operations as described in some implementations herein, any suitable component or combination of components of environment 100, device 700, similar systems, or any suitable processor or processors associated with such a system, may perform the blocks and operations described.

In some implementations, logistic regression can be used for personalization (e.g., user sentiment application suggestions based on a user's pattern of activity). In some implementations, the prediction model can be handcrafted including hand selected labels and thresholds. The mapping (or calibration) from ICA space to a predicted precision within the user sentiment application space can be performed using a piecewise linear model.

In some implementations, the user sentiment measurement system could include a machine-learning model (as described herein) for tuning the system (e.g., selecting labels and corresponding thresholds) to potentially provide improved accuracy. Inputs to the machine learning model can include ICA labels, an image descriptor vector that describes appearance and includes semantic information about user sentiment measurement. Example machine-learning model input can include labels for a simple implementation and can be augmented with descriptor vector features for a more advanced implementation. Output of the machine-learning module can include a prediction of user sentiment.

One or more methods described herein (e.g., method of FIGS. 4 and 6) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:

accessing a video;

causing the video to be displayed on a device corresponding to a user within a graphical user interface including a first sentiment measurement user interface element;

detecting selection of a play button from the graphical user interface;

causing the video to be played as long as the play button is selected;

as the video is being played, measuring a first sentiment value corresponding to a position of the first sentiment measurement user interface element and a timestamp of the first sentiment value corresponding to a time in the video;

when playing the video is completed, stopping playback of the video and stopping the measuring of the first sentiment value;

storing recorded first sentiment values and corresponding timestamps;

causing a second sentiment measurement user interface element to be displayed;

as the video is being played, measuring a second sentiment value corresponding to a position of the second sentiment measurement user interface element and a timestamp of the second sentiment value corresponding to a time in the video;

when the playing video is completed, stopping the playback of the video and stopping the measuring of the second sentiment value; and
storing recorded second sentiment values and corresponding timestamps,
wherein the first sentiment measurement user interface element is combined with the play button, wherein a first user action is associated with the play button and a second user action is associated with measurement of the first sentiment, and
wherein the second sentiment measurement user interface element is combined with the first sentiment measurement user interface element and the play button, and a third user action is associated with measurement of the second sentiment.

2. The computer-implemented method of claim 1, further comprising:
as the video is being played, recording a user video of the user via a camera coupled to the device corresponding to the user.

3. The computer-implemented method of claim 2, further comprising:
programmatically analyzing the user video including one or more of detecting facial expressions and converting audio in the user video into text to generate user video data; and
storing the user video data with recorded sentiment values and corresponding timestamps.

4. The computer-implemented method of claim 1, further comprising:
when the play button is deselected during playback of the video:
pausing playing of the video;
causing a comment box to be displayed;
receiving input from the user via the comment box;
storing the input received from the user along with a time stamp corresponding to a time when the play button was deselected; and
when the play button is selected again, resuming playing the video.

5. The computer-implemented method of claim 1, further comprising:
when the user completes the playing of a video, generating an electronic reward code and associating the electronic reward code with an account of the user.

6. The computer-implemented method of claim 1, wherein the first sentiment measurement user interface element includes a sliding interface in a first axis and the second sentiment measurement user interface element includes a sliding interface in a second axis different from the first axis.

7. A system comprising:
one or more processors coupled to a computer-readable medium having stored thereon software instructions that, when executed by the one or more processors, cause the one or more processors to perform operations including:
accessing a video;
causing the video to be displayed on a device corresponding to a user within a graphical user interface including a first sentiment measurement user interface element;
detecting selection of a play button from the graphical user interface;
causing the video to be played as long as the play button is selected;
as the video is being played, measuring a first sentiment value corresponding to a position of the first sentiment measurement user interface element and a timestamp of the first sentiment value corresponding to a time in the video;
when playing the video is completed, stopping playback of the video and stopping the measuring of the first sentiment value;
storing recorded first sentiment values and corresponding timestamps;
causing a second sentiment measurement user interface element to be displayed;
as the video is being played, measuring a second sentiment value corresponding to a position of the second sentiment measurement user interface element and a timestamp of the second sentiment value corresponding to a time in the video;
when playing the video is completed, stopping playback of the video and stopping the measuring of the second sentiment value; and
storing recorded second sentiment values and corresponding timestamps
wherein the first sentiment measurement user interface element is combined with the play button, wherein a first user action is associated with the play button and a second user action is associated with measurement of the first sentiment, and
wherein the second sentiment measurement user interface element is combined with the first sentiment measurement user interface element and the play button, and a third user action is associated with measurement of the second sentiment.

8. The system of claim 7, wherein the operations further comprise:
as the video is being played, recording a user video of the user via a camera coupled to the device corresponding to the user.

9. The system of claim 8, wherein the operations further comprise:
programmatically analyzing the user video including one or more of detecting facial expressions and converting audio in the user video into text to generate user video data; and
storing the user video data with recorded sentiment values and corresponding timestamps.

10. The system of claim 7, wherein the operations further comprise:
when the play button is deselected during playback of the video:
pausing playing of the video;
causing a comment box to be displayed;
receiving input from the user via the comment box;
storing the input received from the user along with a time stamp corresponding to a time when the play button was deselected; and
when the play button is selected again, resuming playing the video.

11. The system of claim 7, wherein the operations further comprise:
when the user completes the playing of a video, generating an electronic reward code and associating the electronic reward code with an account of the user.

12. The system of claim 7, wherein the first sentiment measurement user interface element includes a sliding interface in a first axis and the second sentiment measurement user interface element includes a sliding interface in a second axis different from the first axis.

13. A nontransitory computer-readable medium having stored thereon software instructions that, when executed by one or more processors, cause the one or more processors to perform operations including:
- accessing a video;
- causing the video to be displayed on a device corresponding to a user within a graphical user interface including a first sentiment measurement user interface element;
- detecting selection of a play button from the graphical user interface;
- causing the video to be played as long as the play button is selected;
- as the video is being played, measuring a first sentiment value corresponding to a position of the first sentiment measurement user interface element and a timestamp of the first sentiment value corresponding to a time in the video;
- when playing the video is completed, stopping playback of the video and stopping the measuring of the first sentiment value;
- storing recorded first sentiment values and corresponding timestamps;
- causing a second sentiment measurement user interface element to be displayed;
- as the video is being played, measuring a second sentiment value corresponding to a position of the second sentiment measurement user interface element and a timestamp of the second sentiment value corresponding to a time in the video;
- when the playing video is completed, stopping the playback of the video and stopping the measuring of the second sentiment value; and
- storing recorded second sentiment values and corresponding timestamps,
- wherein the first sentiment measurement user interface element is combined with the play button, wherein a first user action is associated with the play button and a second user action is associated with measurement of the first sentiment, and
- wherein the second sentiment measurement user interface element is combined with the first sentiment measurement user interface element and the play button, and a third user action is associated with measurement of the second sentiment.

14. The nontransitory computer-readable medium of claim 13, further comprising:
- as the video is being played, recording a user video of the user via a camera coupled to the device corresponding to the user;
- programmatically analyzing the user video including one or more of detecting facial expressions and converting audio in the user video into text to generate user video data; and
- storing the user video data with recorded sentiment values and corresponding timestamps.

* * * * *